UNITED STATES PATENT OFFICE 2,618,655

SULFONAMIDOSTYRENES

Joseph B. Dickey and Theodore E. Stanin, Rochester, N. Y., assignors to Eastman Kodak Company, Rochester, N. Y., a corporation of New Jersey No Drawing. Application May 1, 1948, Serial No. 24,676

5 Claims. (Cl. 260—556)

This invention relates to sulfonamido styrenes, their preparation, and the polymers obtained therefrom. This application is a continuation-in-part of our application Serial No. 581,568, filed March 7, 1945, now U. S. Patent No. 2,520,917.

It has been previously recognized that styrene polymerizes to give resins of good strength. However, these polymers leave much to be desired as regards resistance to elevated temperatures, both moist and dry.

One object of our invention is to provide styrene compounds having new and useful properties. Another object of our invention is to provide a class of styrene derivatives which form polymers having good heat resistance. A further object of our invention is to provide a method of preparing sulfonamido styrenes in which a halosulfonic acid and a haloarylalkane are used as the starting materials therefor. A still further object of our invention is to provide polymers of the styrene type having good heat resistance. Other objects of our invention will appear herein.

We have found that sulfonamido styrene compounds are readily prepared by first reacting haloarylalkanes with halosulfonic acids to form compounds from which amides may be prepared by the use of ammonia or amines from which amides, sulfonamido styrenes may be prepared by dehydrohalogenation with an alkaline material. We have found that the sulfonamido styrenes thus prepared may be polymerized either to form homopolymers or copolymerized with other unsaturated compounds. We have found that the polymers thus resulting have a considerably increased heat resistance over polystyrenes as available at the present time.

The preparation of sulfonamido styrenes in accordance with our invention is accomplished by first reacting a haloarylalkane with chloro- or bromosulfonic acid so as to form the sulfonyl chloride or bromide thereof. This acid chloride or bromide is reacted with ammonia or a primary or secondary amine to form a sulfonamide of the chlor- or bromalkyl phenyl compound. This sulfonamide is then dehydrohalogenated such as by treating with an alkali metal hydroxide or a quaternary ammonium hydroxide so as to form a sulfonamido styrene. The resulting sulfonamido styrene may be either polymerized or copolymerized with vinyl compounds using any of the commonly known polymerization procedures as described in the prior art.

The sulfonyl chloride or bromide compound first formed is prepared by reacting a chlorinated or brominated arylalkane with a halosulfonic acid, such as chlorosulfonic acid. This reaction is carried out slowly under mild temperature conditions, such as accompanied by cooling, particularly when the reagents are first mixed together. It is preferred in the first stage of this reaction that the temperature be kept below 20° C., such as 0–20° C. After the materials have been mixed they are allowed to stand either at room temperature or with a slightly warming temperature, such as up to 70° C. If desired, the product can be refined by distillation using reduced pressure.

The acid chloride which has been prepared by reacting haloarylalkane and chloro- or bromosulfonic acid in substantially equivalent quantities is converted to an amide by mixing with an aqueous solution of ammonia or a primary or secondary amine without the application of temperature thereto. The amide which is formed separates from the reaction mass and can be recrystallized by the use of an organic solvent such as alcohol, chloroform, acetone, or the like. After the amide has been prepared, it is then subjected to the action of an alkali, preferably in alcohol solution, whereby the chloralkyl group attached to the benzene ring is dehydrohalogenated so as to form a sulfonamido styrene, this reaction being carried out at an elevated temperature such as by refluxing on the steam bath. The temperature of this reaction should be the maximum permissible with the alcohol used. However, as this reaction is exothermic, it is only necessary to apply a little, if any, heat to initiate the dehydrohalogenation. The product which is formed may be separated from the reaction mass by precipitation with water. If a highly refined product is desired, recrystallization from an organic solvent is permissible. This, however, is unnecessary with this compound if used for preparing polymers. In the various steps used in preparing the sulfonamido styrene it is only necessary that the compound be separated from its reaction mixture as a highly refined material is not necessary in carrying out the subsequent steps in accordance with our invention.

The sulfonamido styrenes prepared in accordance with our invention may be polymerized either by themselves or mixed with vinyl monomers. It is preferred, however, that the sulfonamido styrenes comprise at least 80% of the mass which is to be polymerized. Some of the polymerizable monomers, both vinyl and non-vinyl, which may be employed for copolymerizing with the sulfonamido styrenes are the following: isobutylene, vinyl acetate, vinyl methyl ketone, vinyl chloride, vinyl fluoride, vinylidine difluoride, vinylidine dichloride, vinylidine fluorde chlorde, styrene, vinyl methyl ether, β-cyanovinylmethyl ether, vinyl-β-cyanoethyl ether, vinylmethylsulfone and sulfoxide, methyl acrylate,

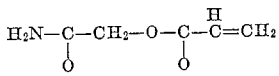

ethylene, tetrafluoroethylene, methyl fumarate, fumaramide, acrylic acidamides, acrylonitrile, crotonnitrile, vinyl urethane, fumaronitrile, β-cyanoacrylic acidamides, β-cyanoalkyl acrylates and the like. For the preparation of fibrous materials acrylonitrile has been found to be of value, and, therefore, this material is employed for copolymerization with the sulfonamido styrenes for the making of fabrics. In preparing the polymers one or more of the above monomers may be copolymerized with one or more of the sulfonamido styrenes, or the carboxyamido styrenes in any desired amount. For instance, in some cases equal parts of the vinyl monomer and the sulfonamido styrene prove to be satisfactory.

The compounds which may be prepared in accordance with our invention have the following general formula:

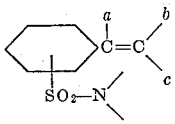

wherein a, b, and c are selected from hydrogen, halogen, and alkyl and wherein the phenyl group may be substituted with one or more groups selected from halogen, alkyl, alkoxy, hydroxy, amino, and acylamino. The substituents on the nitrogen may be either hydrogens or alkyl groups.

The following examples illustrate the preparation of the sulfonyl halides, which methods illustrate the first step of our invention.

*Example 1.*—100 parts of 1-chloro-1-phenyl ethane was added slowly with stirring to 600 parts of freshly distilled chlorosulfonic acid at 10–15° C. After the addition had been completed the mixture was allowed to stand at room temperature for one hour and was then warmed for one hour at 60–70° C. The mass was then poured onto ice thereby precipitating the sulfonyl chloride formed. The product was extracted with benzene and dried. If further refining is desired, the product can be distilled under reduced pressure. A mixture of the ortho and para compounds was obtained.

*Example 2.*—100 parts of 2-bromo-1-phenyl ethane was reacted with 600 parts of chlorosulfonic acid in the same manner as described in the preceding example. The resulting product was a mixture of ortho and para sulfonyl chlorides having the formula:

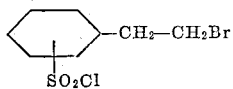

*Example 3.*—The compound having the formula:

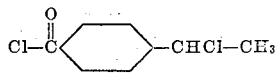

was prepared by heating the corresponding acid with an excess of sulfonyl chloride. The product was purified by distillation under reduced pressure, and sulfonated as described in Example 1.

*Example 4.*—100 parts of mixed diethyl benzene was heated on a water bath with an excess of sulfonyl chloride. The reaction product was purified by distillation. This compound was then sulfonated as in Example 1, and the compound which resulted had the following formula:

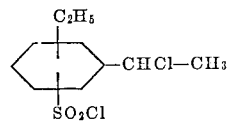

The resulting product was made up of a mixture of isomers of this compound.

*Example 5.*—100 parts of p-ethoxy-β-phenyl ethyl bromide was sulfonated as described in Example 1 and poured onto ice. The resulting sulfonyl chloride separated from the reaction mass. The product was a mixture of isomers having the formula:

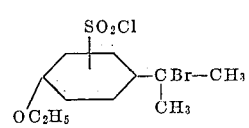

This product can be separated into its isomers by distillation under reduced pressure.

*Example 6.*—100 parts of 1-bromo-1-phenyl propane was heated on a water bath in 600 parts of chlorosulfonic acid and then at 165° C. until no more hydrogen chloride was evolved. The mass was poured onto ice when cold and was worked up as described in Example 1. The resulting product may be represented by the formula:

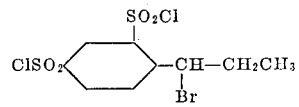

The product was a mixture of isomers of this formula.

*Example 7.*—157 parts of β-phenyl ethyl bromide was slowly added to 500 parts of chlorosulfonic acid in a vessel equipped with stirring apparatus so that the mass was kept agitated. The temperature was held below 20° C. by external cooling. After the addition of the bromide was completed, the cooling was discontinued and the mass was allowed to stand for one hour. The reaction mixture was then poured over cracked ice and the sulfonyl chloride obtained was taken up in chloroform. The chloroform solution was separated and dried over sodium sulfate. The chloroform was then removed by distillation and the sulfonyl chloride obtained was distilled under reduced pressure. This product was found to have a boiling point of 153–155° C. at 1.2 mm. of mercury pressure. The β-(p-chlorosulfonyl phenyl)-ethyl bromide was a white crystalline solid. In the distillation of the sulfonyl chloride there is first obtained a lower boiling liquid fraction which is β-(o-chlorosulfonyl phenyl)-ethyl bromide.

The following examples illustrate the preparation of amides of the compounds prepared in the preceding examples:

*Example 8.*—The product resulting from Example 2 was added with stirring to 500 parts of cold aqueous ammonia water. After a short time a yellow solid precipitated out which material was filtered off, washed and dried. The crude product was found to melt at 165–170° C. and after one recrystallization from chloroform melted at 178–181° C. Analysis showed the product had the proper amounts of nitrogen and bromine so that the product had the formula:

The ortho isomers can be obtained from the chloroform mother liquors resulting from the crystallization as an oil. By substituting for ammonia a primary or secondary amine the corresponding amide can be prepared. The various amines which may be employed are the following: methyl-, ethyl-, propyl-, amyl-, cyclohexyl-, cetyl-, β-hydroxyethyl-, trifluoroethyl-, β-methoxyethyl-, β-cyanoethyl-, aniline, β-carboxyamidoethyl-, β-sulfonamido-, ethyl-, dimethyl-, diethyl-, ethylbutyl, tetrahydro-, furfuryl-, allyl-, etc.

*Example 9.*—10 parts of β-(p-chlorosulfonyl phenyl)-ethyl bromide was mixed with 100 parts of concentrated ammonium hydroxide. The mixture was stirred for one hour, and the solid product obtained was filtered off. The β-(p-sulfonamido phenyl)-ethyl bromide having a melting point of 186° C. was purified by recrystallization from alcohol.

*Example 10.*—43 parts of β-(p-chlorosulfonyl phenyl)-ethyl bromide was mixed with 100 parts of 25% aqueous dimethylamine. The reaction mass was stirred for 1½–2 hours. The precipitated product obtained was filtered and purified by recrystallization from alcohol. The resulting product was β-(p-N,N-dimethyl sulfonamido phenyl)-ethyl bromide having a melting point of 98–99° C. The ortho compound can be prepared in the same manner by using an ortho compound as the starting material.

The following examples illustrate the preparation of sulfonamido styrenes in accordance with our invention:

*Example 11.*—2.64 parts of the amide resulting from the process of Example 8 were dissolved in 100 parts of ethanol and 11.2 parts of potassium hydroxide dissolved in 150 parts of ethanol was added. The mass was refluxed on a steam bath. Potassium bromide separated after about ten minutes. The liquid obtained was evaporated to 10 parts and was then poured into water, filtered, and the residue obtained was washed and dried. The product was crystallized from a mixture of benzene-ligroin. It was found to soften at 95° C. and also was susceptible to polymerization.

*Example 12.*—A solution of 4 parts of potassium hydroxide in 50 parts of alcohol was added to 26.4 parts of β-(p-sulfonamido phenyl)-ethyl bromide in 50 parts of alcohol. The reaction was exothermic and after 10 or 15 minutes the precipitated potassium bromide was filtered. The filtrate was made neutral by the addition of hydrochloric acid and was then poured into water. The precipitated product was filtered and purified by recrystallization from chloroform. The p-sulfonamido styrene obtained was found to have a melting point of 123° C.

*Example 13.*—10 parts of

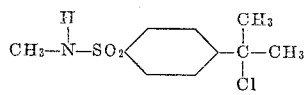

were placed in 50 parts of synthetic quinoline and heated to 125–150° C. using copper chloride as an inhibitor. When titration showed that substantially all of the hydrogen chloride was formed which could be formed or, in other words, that the reaction had been completed, the reaction mixture was cooled, poured into cold hydrochloric acid, filtered, washed, and dried. The product formed had the formula:

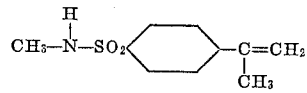

By means of processes in accordance with our invention the following compounds can be prepared:

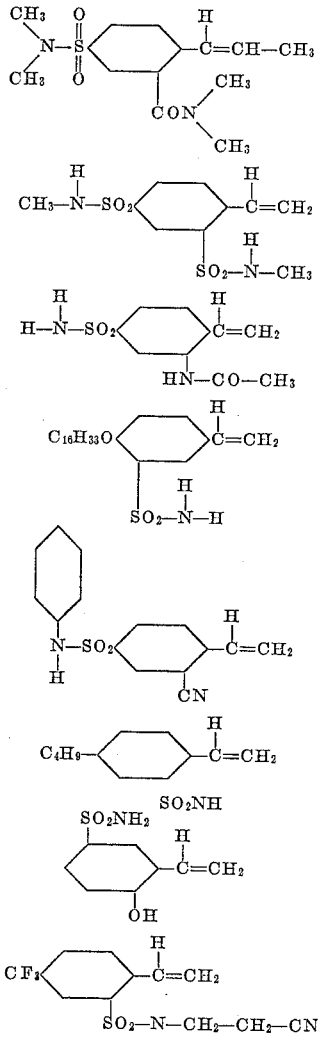

The sulfonamido styrenes prepared in accordance with our invention are useful for preparing resins which are of especial value for textile purposes. These polymerizations may be carried out by mixing the monomers with a peroxide type polymerization catalyst and elevating the temperature. If desired, the polymerization may be carried out by a bead polymerization method or by forming an emulsion of the monomers and subjecting to an elevated temperature until the desired polymerization has occurred.

The following examples illustrate various polymerization processes carried out using sulfonamido styrenes:

*Example 14.*—18 parts of p-sulfonamido styrene were mixed with 6 parts of acrylonitrile and 0.02 part of benzoyl peroxide. The mass was heated in a sealed tube at 50° C. for two days. When cooled, the tube was opened and the tough solid product was purified by dissolving in pyridine and poured into water. Instead of pyridine some other suitable solvent might be employed as a substitute therefor in the process. If desired, during the polymerization the tube may be exposed to ultraviolet light to facilitate the polymerization operation. To obtain fibers from this polymer it is dissolved in acetone and the fibers are spun from that solution.

*Example 15.*—21 parts of a mixture of o-, m-, and p-ethylsulfonamido styrenes were mixed with 18 parts of acrylonitrile, and 0.03 part of benzoyl peroxide. The mass was polymerized by the procedure employed in the preceding example. The polymerization was stopped when a sample shows that the polymerization is about 60% complete. The polymer is recovered from the mass by the method employed in the preceding example. If desired, in a polymerization of this type, some other material such as phenyl-α-naphthylamine or hydroquinone might be added at the desired moment to destroy the catalyst and stop the polymerization.

*Example 16.*—A mixture of 21 parts of p-di-N - methylsulfonamido styrene, 20 parts of methyl iso-propenyl ketone and 0.03 part of benzoyl peroxide were heated at 50° C. for several days in a sealed tube and then slightly raised to 75° C. A hard, tough product was obtained suitable for the preparation of films, fibers, or molded products. The resin is recovered from the polymeric mass in the same manner as described in the preceding examples.

*Example 17.*—A mixture of 11 parts of

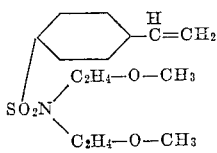

6 parts of vinyl chloride, and 8 parts of vinyl acetate were polymerized in the presence of 0.05 part of benzoyl peroxide in a closed vessel beginning at 30° C. The temperature was raised to 80° C. A slightly yellow tough solid resulted which was purified by the procedure specified in Example 14. This solid was suitable for use in preparing fibers, films, molded products or the like.

*Example 18.*—3 parts of

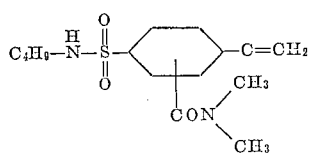

2 parts of

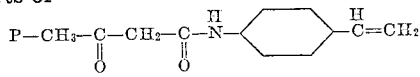

31 parts of styrene, 0.5 part of urea peroxide, 55 parts of water, 0.9 part of gelatin, 0.05 part of 2-ethylhexanol, 0.189 part of sodium ethyl naphthalene sulfonate, and 0.067 part of carbon tetrachloride were mixed together so as to form an emulsion, and this mixture was shaken for 3-4 days at 50-60° C. The resulting polymer was precipitated by adding dilute mineral acid thereto to break the emulsion. The precipitated product was then filtered, washed, and dried.

*Example 19.*—An emulsion was formed consisting of 6 parts of

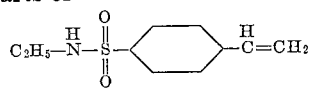

31 parts of styrene, 0.5 part of urea peroxide, 55 parts of water, 0.9 part of gelatin, 0.05 part of 2-ethylhexanol, 0.189 part of sodium ethyl naphthalene sulfonate, and 0.067 part of carbon tetrachloride were mixed together so as to form an emulsion, and this mixture was shaken for 3-4 days at 50-60° C. The resulting polymer was precipitated by adding dilute mineral acid thereto to break the emulsion. The precipitated product was then filtered, washed, and dried.

*Example 20.*—10 parts of

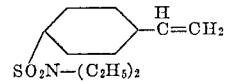

10 parts of p-(N-p-tolylsulfonamido) styrene, and 0.01 part of benzoyl peroxide were all mixed together by dissolving in acetic acid. The solution was slowly heated up to 150° C. over a period of several days. The mixture was cooled and purified as described in the preceding examples. A yellowish high-melting solid was obtained.

We claim:

1. A compound having the formula

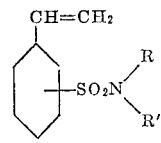

R and R′ each being a member of the group consisting of hydrogen, methyl and ethyl.

2. p-(Ethyl-sulfonamido)-styrene.
3. p-(Methyl-sulfonamido)-styrene.
4. A sulfonamido styrene having the formula

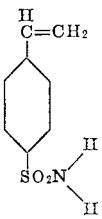

5. A sulfonamido styrene having the formula

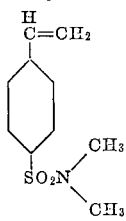

JOSEPH B. DICKEY.
THEODORE E. STANIN.

REFERENCES CITED

The following references are of record in the file of this patent:

UNITED STATES PATENTS

| Number | Name | Date |
|---|---|---|
| 2,036,410 | Graves | Apr. 7, 1936 |
| 2,500,025 | Dickey et al. | Mar. 7, 1950 |
| 2,520,917 | Dickey et al. | Sept. 5, 1950 |
| 2,527,300 | Lendley | Oct. 24, 1950 |

OTHER REFERENCES

Bernthsen and Sudborough: Textbook of Organic Chemistry (1931), D. Van Nostrand Co., pp. 432–433.

Jour. Amer. Chem. Soc., vol. 69, pp. 2237–2238 (1947).

Beilstein, vol. 11, pp. 119–120.

Ellis: Chemistry of Synthetic Resins, vol. I, pp. 252–253 (1935), Reinhold Pub. Corp.

Meyer: Liebigs Annalen, vol. 219 (1883), pp. 305 and 306.